June 12, 1934.   H. W. RUPPLE   1,963,033
SCREW CUTTING MACHINE
Filed May 1, 1933   4 Sheets-Sheet 1
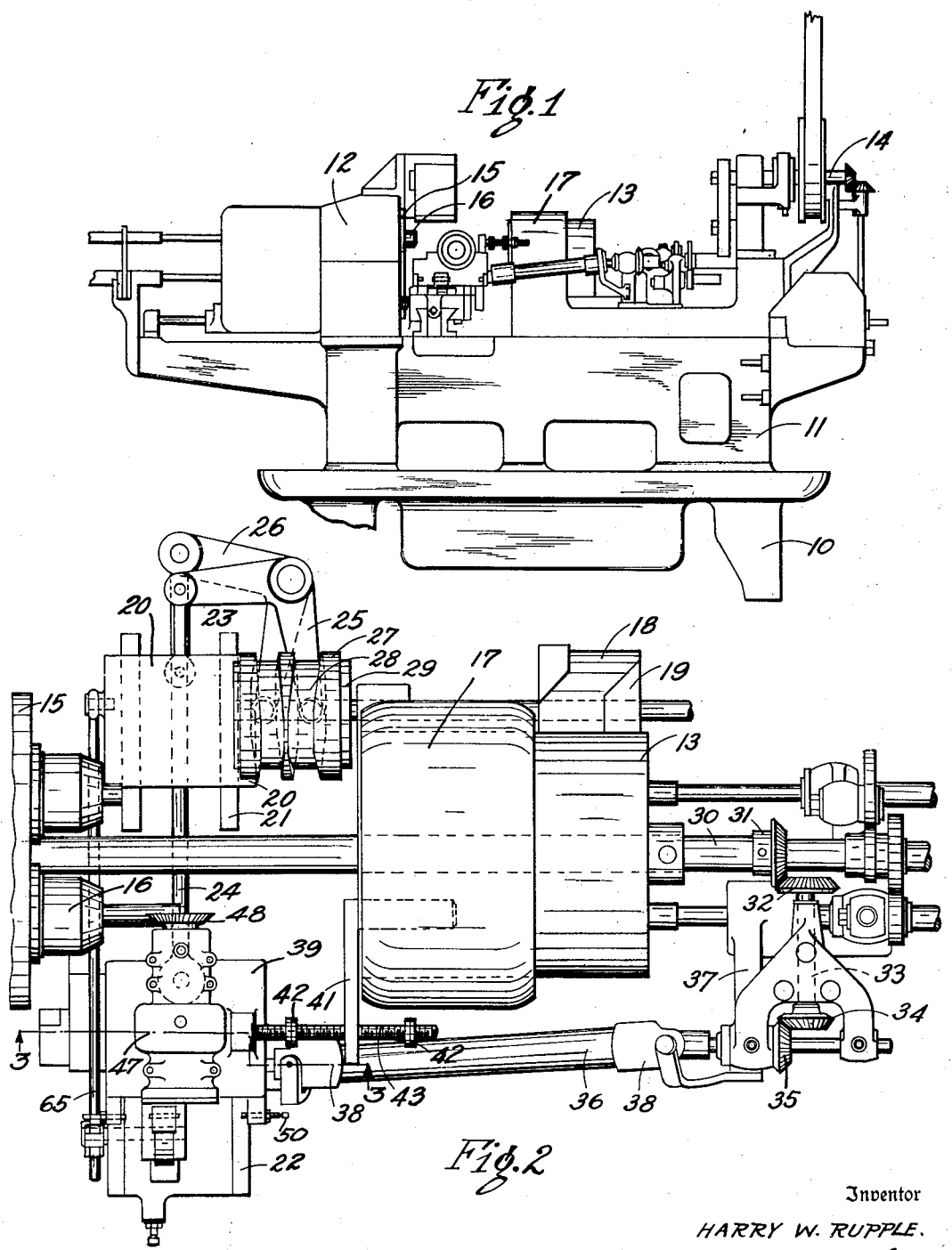
Inventor
HARRY W. RUPPLE.
By Richey & Watts
Attorneys

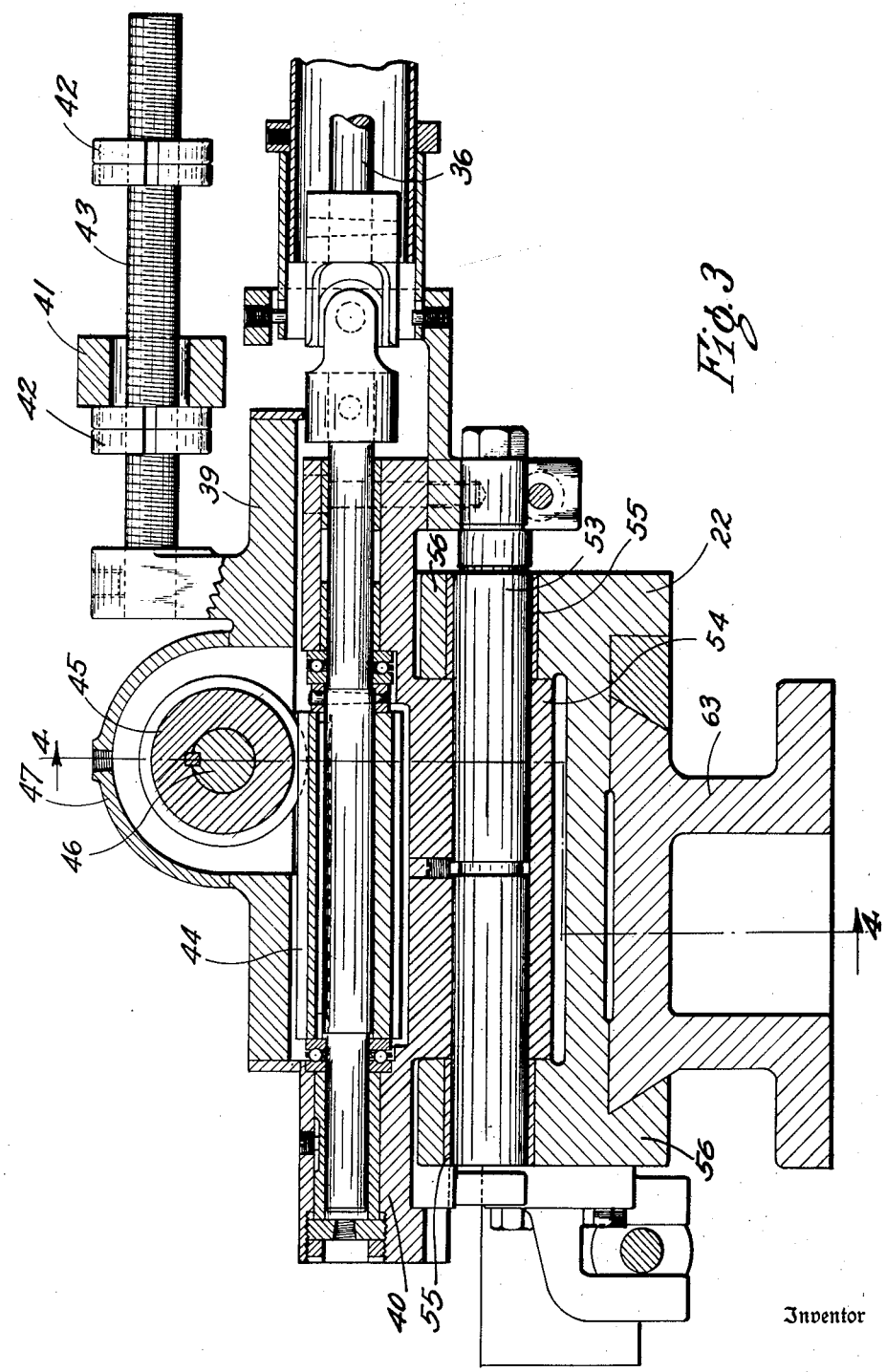

Patented June 12, 1934

1,963,033

UNITED STATES PATENT OFFICE 1,963,033

SCREW CUTTING MACHINE

Harry W. Ruppel, Shaker Heights, Ohio, assignor to The Cleveland Automatic Machine Company, Cleveland, Ohio, a corporation of Ohio Application May 1, 1933, Serial No. 668,701

7 Claims. (Cl. 29—57)

This invention relates broadly to screw machine tool actuating mechanisms and more specifically to improvements therein which embody apparatus for effecting the reciprocation of a tool slide having a rotatively driven cutting tool mounted thereon.

The subject matter of this invention is described and illustrated in a copending application, Serial No. 303,342 filed August 31, 1928, wherein there is disclosed a rotatively driven cutting tool adapted to form the work through the generating principle, the supporting structure therefor being coordinated for transverse movement with one of the cross slides of the machine and organized for longitudinal movement to and from the work through linkage associated with the tool support.

The present invention comprehends apparatus which is adapted to effect the foregoing function and in addition to automatically lower the cutting tool into operative engagement with the work at the end of the inner reciprocative cycle of the tool cross slide and to elevate the tool from the work at the end of the longitudinal translation thereof. The invention is further directed to mechanism for effecting rotative drive of the cutting tool during the reciprocative movement of the tool carriage, as defined above.

Other objects and advantages reside in the specific construction and aggroupment of elements peculiar to the structure of the device, as will become apparent from a more complete examination of this specification, in the claims of which there is assembled and pointed out certain combination of parts and specific constructions illustrative of the scope and spirit of the invention.

In the drawings which illustrate the preferred embodiment of the invention—

Figure 1 is a front elevational view of a screw machine illustrating the improved tool actuating mechanism coordinated with the forward cross slide of the machine.

Figure 2 is a fragmentary plan view of the cross slide and control linkage of the apparatus illustrated in Figure 1.

Figure 3 is a longitudinal sectional view of the tool supporting mechanism, the section being taken on a plane indicated by the line 3—3 in Figure 2.

Figure 4:
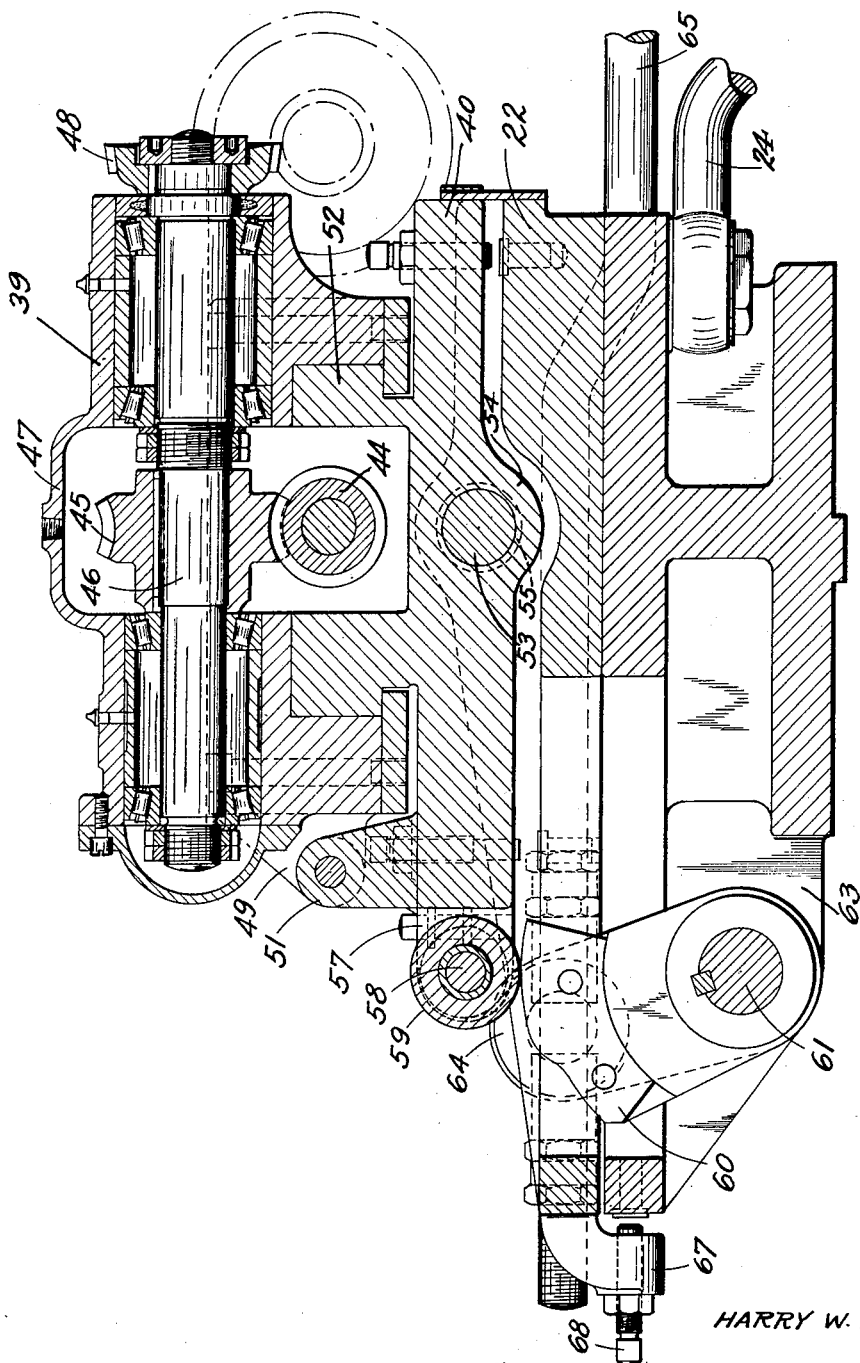
Figure 4 is a transverse sectional view of the same, the section being taken on a plane indicated by the line 4—4 in Figure 3.

The screw machine which is illustrated somewhat diagrammatically in Figure 1 comprises generally a base 10 having a bed 11 mounted thereon which supports the spindle head 12, a tool support 13 and a power transmission gearing unit 14.

The spindle head 12 which embodies a cylinder 15 supports a plurality of rotatable shafts spaced in equal chordal relation. Upon the ends of these shafts and extending from the cylinder there are work holding collets 16. The cylinder is adapted to be rotatively indexed within its housing having gearing disposed within the body thereof to effectuate the simultaneous rotative movement of the spindles or collet shafts 16.

The tool support 13 is guided within a housing 17 formed in the bed of the machine and is longitudinally reciprocated toward and away from the spindle head through an arm which engages a groove or guideway 18 formed in the perimeter of a drum 19, as seen in Figure 2. Adjacent the spindle head 12 there is a cross slide 20 disposed for transaxial reciprocation in relation to the collet shafts 16. The cross slide 20 is supported upon shears formed in a frame 21 mounted upon the bed 11 and is reciprocatively translated thereon by the links 23 and 24 connected respectively with bell cranks 25 and 26, the end portions whereof are operatively engaged within grooves or guideways 27 and 28 in the perimeter of a rotatably driven drum 29 mounted upon the rearward portion of the machine, as illustrated in Figure 2.

Associated with the transmission gearing 14 there is a driving shaft 30 upon which is mounted a bevel gear 31 intermeshed with a companion gear 32 supported upon a shaft 33. The shaft 33 is provided with a bevel pinion 34 on the opposed end thereof which drives a bevel gear 35 connected to a propeller shaft 36. The gear train, comprising the gears 32, 34 and 35 and the shaft 33 are supported in a bracket 37 suitably affixed to the bed 11 of the machine. The propeller shaft 36 is provided with universal joints 38 which are telescopically mounted with splined connections upon the end portions of the shaft to accommodate universal movement of a tool slide 39 connected therewith. The slide 39 is longitudinally reciprocable upon a sub-frame 40 which is pivotally mounted upon a cross slide 22 transversely disposed upon the bed of the machine and aligned with the slide 20. The reciprocation of the slide 39 is effected by the movement of the tool support 13 through a laterally extended arm 41 adapted for engagement with spaced collars 42 adjustably mounted upon a push rod 43 affixed to the slide 39. Within the slide 39 there is a worm gear 44 rotatably driven by the propeller shaft 36. The worm gear is intermeshed with a worm wheel 45 keyed upon a shaft 46 journalled in bearings provided in a housing 47 forming a portion of the body of the carriage 39. Upon the end of the shaft 46 and rotatively driven thereby there is mounted a cutter or hob 48. The outer face of the carriage 39 is provided with bosses 49 having set screws 50 therein positioned for abutting engagement with a lug 51 in the sub-frame 40 to limit the reciprocative movement of the carriage upon the sub-frame guideway 52. The pivotal connection of the sub-frame upon the cross slide is effected through a shaft 53 which is mounted within a boss 54 formed in the central portion of the carriage, the end portions of the shaft 53 being journalled in bearings 55 provided in vertical webs 56 of the cross slide 20. The outer end of the sub-frame 40 is formed with spaced bosses or ears 57 which are bored to receive a pin 58 having a roller 59 mounted thereon. The roller 59 is engageable with a cam 60 keyed upon a shaft 61 journalled in bosses 62 formed in a frame 63 which supports the carriage 22. Upon the end of the shaft 61 there is a crank arm 64 having a yoked end which receives a push rod 65. The push rod 65 extends transverse the machine and is pivotally mounted upon the body of the transversely operable cross slide 20.

Figure 5:
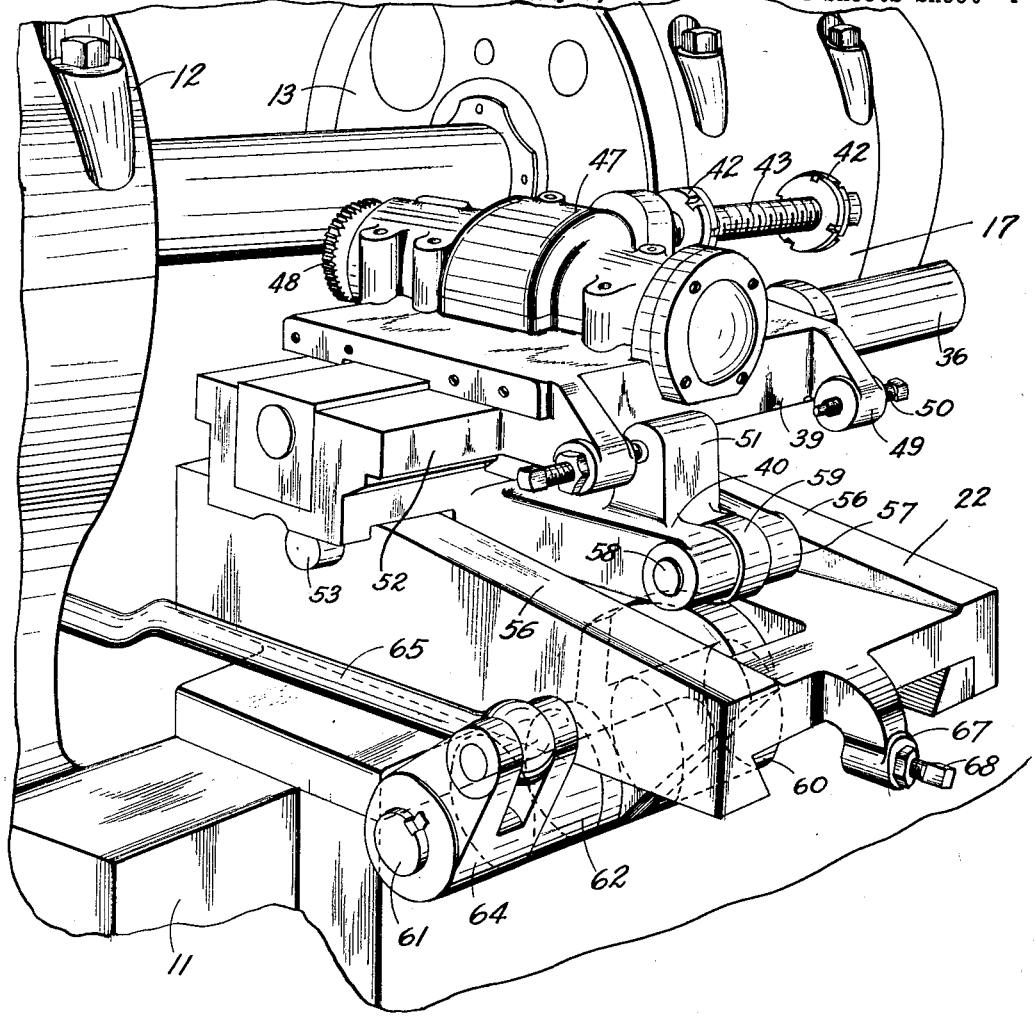
Figure 5 is a view in perspective illustrating the relation of the component parts of the tool carrier assembly and the arrangement thereof upon the machine.

As shown in Figure 5 the cross slide 22 is provided with an arm 67 having an adjustable set screw 68 therein which is disposed for abutting engagement with a frame 63 to limit the inward reciprocative movement of the carriage 22.

In operation, when the tool support 13 is reciprocated longitudinally toward and away from the work holding spindles 16 the arm 41 will engage respectively the inner and outer collars 42 and effectuate the longitudinal reciprocation of the slide 39, the length of the translation thereof being predetermined by the adjusted position of the collars 42. The cutter 48 is rotatively driven during the translation of the carriage 39 by the worm gearing 44 and 45, the drive therefor being effectuated through the gearing connected with the propeller shaft 36. The universal joints and splined connections therefor accommodate the longitudinal and transverse movement of the slide during the translation thereof.

Transverse movement of the cross slide 22 is effected through the cammed guideway 28, the correlated bell crank 26 and the connecting link 24 therefor. The drum 29 is rotatively driven by the shaft upon which the tool support drum 19 is mounted and the guideway 27 is suitably formed to effectuate movement of the cross slide 20, in timed relation with the longitudinal movement of the tool support. Thus, the cutter 48 will be advanced or retracted transversely with respect to the work after the prerequisite longitudinal movement of the carriage 39 has been effected. The cutter 48 is moved vertically into and out of engagement with the work during the operating cycle through the agency of the cam 60 and actuating linkage 64 and 65 therefor. When the cutter is positioned longitudinally and transversely for engagement with the work the guideway 27 is disposed to effect adjustment of the bell crank 25 to shift the cross slide 20 inwardly. With the movement of this slide the crank arm 64 and cam 60 are rotatively adjusted to cause the sub-frame 40 and hobbing tool 48 thereon to be lowered into cutting relation with the work. Continued rotation of the drum 29 will cause the retraction of the slide 20, the oscillation of the cam 60 and adequate elevation of the inner end of the sub-frame 40 to effect the disengagement of the cutting tool 48 from the work. After the tool support has moved the tool slide into position for cutting engagement with the work the rotative movement of the worm 44 will cause the worm wheel 45 to move longitudinally thereover and thus effect the translation of the slide at a suitable feed rate to produce the generation of a thread by the cutter.

Among the advantages of the structure above defined there resides the facility of effectuating the generation of a worm gear or screw thread of any length or at any point in the length of the stock. Such product may be obtained by positioning the tool longitudinally and transversely in relation to the work then entering the cut at the prerequisite point in the length thereof and subsequently lifting and retracting the tool from the threaded convolutions thus generated at the predetermined point. Since the cutter is rotatively driven in but one direction while engaged with the work the deleterious results of the back lash in the drive gearing will be eliminated and a thread of perfect form will be procured.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. In a machine of the character described, the combination of a rotatable work carrying spindle, a tool support mounted axially parallel with said spindle and adapted for sliding movement, means for rotating said spindle, a cross slide mounted transversely of said spindle, means for reciprocating said cross slide, a tool slide pivotally mounted upon said cross slide, a worm gear mounted within said slide paraxially disposed with the spindle, means for effecting the vertical oscillation of said tool slide, thread cutting mechanism carried by said tool slide including a rotatable cutter, means associated with said tool support and tool slide for effecting the reciprocative translation thereof towards and away from the spindle, and gearing connected therefor with said worm to effect the rotation of said cutter and the translation of the tool slide upon the cross slide.

2. In a machine of the character described, the combination of a rotatable work carrying spindle, a tool support mounted axially parallel with said spindle and adapted for reciprocative movement, a cross slide mounted transverse said spindle, driving means for effecting the reciprocation thereof, a tool slide pivotally mounted upon the said cross slide, means associated therewith and with said tool support to effect the longitudinal reciprocation thereof, thread cutting mechanism carried by said tool slide including a rotatable cutter, means for rotatively driving said cutter and means associated with said tool slide for vertically reciprocating the same.

3. In a machine of the character described, the combination of a rotatable work carrying spindle, a tool support mounted axially parallel with said spindle and adapted for reciprocative movement, a cross slide mounted transverse said spindle, driving means for effecting the reciprocation thereof, said driving means being intergeared with the driving means for said spindle, a tool slide carrying member pivotally mounted upon said cross slide, means for vertically reciprocating said carrying member, means for longitudinally reciprocating said tool slide, thread cutting mechanism carried by said tool slide including a rotatable cutter and gearing mounted in said tool slide for rotating said cutter, and effecting relative movement between the tool slide and cross slide.

4. In a machine of the character described, the combination of a rotatable work carrying spindle, a tool support mounted axially parallel with said spindle and adapted for reciprocative movement, a cross slide mounted transverse said spindle, driving means for effecting the reciprocation thereof, a tool slide pivotally mounted upon the said cross slide, a cam carried by said cross slide for vertically reciprocating said tool slide, means connected with the said tool slide and with said tool support for reciprocating said slide parallel with said spindle, worm gearing carried by said tool slide, a threaded generating cutter driven by said worm gearing and yieldable driving means for rotatively driving said cutter.

5. In a machine of the character described, the combination of a rotatable work carrying spindle, a tool support mounted axially parallel with said spindle and adapted for reciprocative movement, a cross slide mounted transverse said spindle, driving means for effecting the reciprocation thereof, a tool slide carrying member pivotally mounted on said slide, a cam associated therewith for vertically reciprocating said carrying member, means for actuating said cam, means for longitudinally reciprocating said tool slide parallel with the spindle, thread cutting mechanism carried by said tool slide including a rotatable cutter, gearing mounted in said tool slide for rotating said cutter and effecting relative movement between the tool slide and carrying member, and means associated with said gearing for rotatively driving the same.

6. In a machine of the character described, the combination of a rotatable work carrying spindle, a tool support mounted axially parallel with said spindle and adapted for reciprocative movement, a cross slide mounted transverse said spindle, driving means for effecting the reciprocation thereof, a tool slide carrying member pivotally mounted on said slide, a cam mounted thereon for vertically reciprocating said carrying member, a second cross slide disposed transverse said spindle and opposite said first named cross slide, means for reciprocating same, driving connections associated therewith for actuating the said cam, a tool slide mounted upon said carrying member, means for reciprocating said tool slide parallel with the spindle, thread cutting mechanism carried by said tool slide including a rotatable cutter, means for rotatively driving said cutter and means associated with said tool support for reciprocating said tool slide axially parallel with said spindle.

7. In a machine of the character described, the combination of a rotatable work carrying spindle, a tool support mounted axially parallel with said spindle and adapted for sliding movement, gearing for rotating said spindle, a cross slide mounted transversely of said spindle, a drum having guideways therein intergeared with the driving mechanism for said spindle, means associated with said cross slide and with the guideways in said drum for effecting movement transverse said spindle, a tool slide pivotally mounted upon said cross slide, a cam mounted upon said cross slide for effecting the vertical reciprocation of said tool slide, means connected with said drum guideways for actuating said cam, a worm mounted within said tool slide and engaged with said worm, a thread generating tool operatively coordinated with said worm wheel, driving connections between said worm and the drive gearing for said spindle, means connected with said tool support for reciprocating said tool slide and adapted to facilitate independent movement between the tool slide and cross slide.

HARRY W. RUPPEL.